United States Patent [19]

Gordon et al.

[11] Patent Number: 4,813,578

[45] Date of Patent: Mar. 21, 1989

[54] SELF OPENING POUR SPOUT AND SCREW CAP

[75] Inventors: Robert L. Gordon, Monroe; Roderick W. Kalberer, Salisbury Mills, both of N.Y.

[73] Assignee: International Paper Company, Purchase, N.Y.

[21] Appl. No.: 167,277

[22] Filed: Mar. 11, 1988

[51] Int. Cl.[4] .............................................. B67D 3/00
[52] U.S. Cl. ................................... 222/541; 206/604; 206/621.3; 206/621; 220/258; 222/546; 222/562; 229/123.2
[58] Field of Search ............... 222/541, 501, 562, 556, 222/557, 546, 545; 220/258, 265, 266, 260, 359; 229/123.2; 206/621.3, 621, 604, 605, 626, 621.2, 621.4, 621.5, 621.7; 215/341

[56] References Cited

U.S. PATENT DOCUMENTS

| 234,342 | 11/1880 | Stewart | 215/311 |
|---|---|---|---|
| 2,066,947 | 1/1937 | Remington et al. | 222/541 X |
| 2,098,763 | 11/1937 | Sebell | 222/541 |
| 2,131,774 | 10/1938 | Waring | 215/250 |
| 4,299,330 | 11/1981 | Walter | 220/288 |
| 4,340,148 | 7/1982 | Beckham | 215/329 |
| 4,399,924 | 8/1983 | Nilsson | 220/257 |
| 4,469,249 | 9/1984 | Malpas et al. | 220/278 X |
| 4,483,464 | 11/1984 | Nomura | 222/83 |
| 4,600,127 | 7/1986 | Malpas et al. | 222/541 X |
| 4,705,197 | 11/1987 | Gordon et al. | 222/541 X |

FOREIGN PATENT DOCUMENTS 1417219  10/1965  France ............................. 220/258

Primary Examiner—Kevin P. Shaver
Attorney, Agent, or Firm—Walt T. Zielinski

[57] ABSTRACT

A pour spout construction particularly adapted for longer shelf life barrier paperboard containers, such as containers of the gable top type. Barrier containers often carry products and the interior surfaces of the former are lined or covered with a barrier layer. According to this invention a dispensing opening is formed in the paperboard and the major barrier layer extends across and covers this opening. An externally threaded pour spout, attached to the container, carries a threaded cap which normally closes the pour spout. This cap carries an innermost annular skirt whose lower edge is adhered to that barrier layer portion which spans the dispensing opening. When the cap is unscrewed from the spout, the innermost annular skirt carries a part of the barrier layer away from its normal, sealing position, thus rupturing the barrier layer and permitting dispensing of the container contents.

6 Claims, 2 Drawing Sheets

SELF OPENING POUR SPOUT AND SCREW CAP

BACKGROUND OF THE INVENTION

This invention relates to the packaging of liquid or powdered products, such as fruit juices, milk, sugar, salt, soap powders and the like and more particularly to a carton construction which provides both the required protective barrier sealing of the product while at the same time permitting ease of initial opening of the container for dispensing of the contents.

In the field of protective barrier packaging, it is essential that the interior surfaces of the container are completely covered or laminated with barrier layer materials. This layer may be formed from metal foil for example, or alternatively, it may be defined by a laminate of several layers, with each layer being of a different composition, such as polyethylene, Surlyn, metallic foil, etc. Additionally, it is desireable that when the initial dispensing operation is to take place, thereby necessitating a breaking or a rupture of the barrier layer, that such rupturing takes place with a minimum of inconvenience to the consumer. Exemplary of the efforts of others to provide a pour spout construction which will result in the rupture of a dispensing opening seal upon initial use of the package are shown in U.S. Pat. No. 4,399,924 issued to Nilsson and U.S. Pat. No. 4,483,464 issued to Nomura. Other examples of combination liquid pour spouts and seals are illustrated in U.S. Pat. Nos. 4,469,249 and 4,600,127, both issued to Malpas et al.

While apparently operative for the purpose described for each of these constructions, no one of them utilizes a barrier layer which covers the entire interior surface of the container, with this barrier layer functioning also as a seal for the dispensing spout. Further no one of them exhibits the same or similar construction.

SUMMARY OF THE INVENTION

According to the practice of this invention, a container for liquids and powders such as a gable top type carton formed from paperboard, provided with barrier layers over all of its interior surfaces, is provided with a die cut dispensing opening in the paperboard, with this dispensing opening being spanned or covered by both the interior barrier layers and by the conventional outer layer of low density polyethylene on the exterior surfaces of the carton or container. A novel pour spout and cap construction is provided wherein the pour spout is mounted on the exterior of the container adjacent the dispensing opening. An otherwise conventional screw cap is provided with an innermost annular skirt whose lowermost portions are adhered to the barrier layer. By virtue of this construction, unscrewing and removing the cap on the pour spout ruptures the barrier layer to thereby permit dispensing of the liquid through the dispensing opening. Thus, no sharp implements are required for piercing the barrier layer or other seal to open the entrance to the pour spout. Further, in order to gain access to the contents, the consumer is accustomed to unscrewing of a cap and this unscrewing both removes the cap and, as noted above, ruptures the barrier layer to permit dispensing.

DETAILED DESCRIPTION OF THE INVENTION

Figure 1:
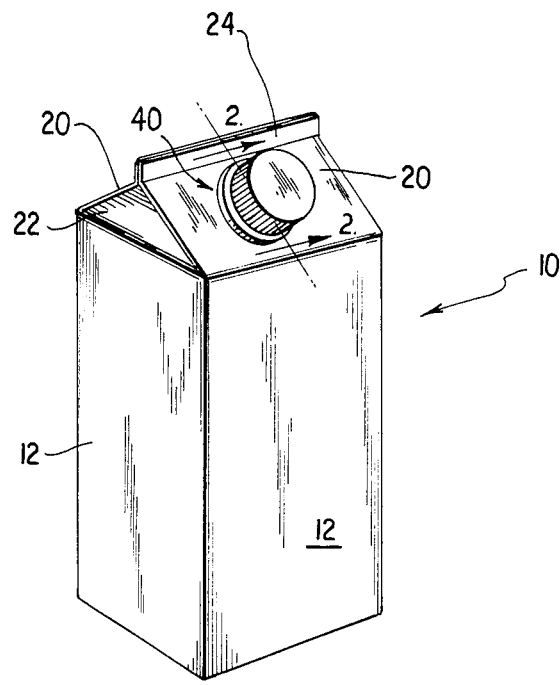
FIG. 1 is a perspective view of a typical gable top liquid container provided with the pour spout and screw cap construction of this invention.

Referring now to FIG. 1, the numeral 10 denotes a paperboard container of conventional shape, and provided with the pour spout and screw cap construction of this invention. The container is generally square, having four sidewalls 12 and a gable top having a pair of opposed external walls 20 and a pair of internal gable top walls 22, only one of which is visible in FIG. 1. The bottom of the carton 10 is closed so that it is flat. The numeral 24 denotes the usual sealing fin at the top of the gable, with numeral 40 denoting the pour spout and screw cap construction of this invention, now to be described in detail.

Figure 2:
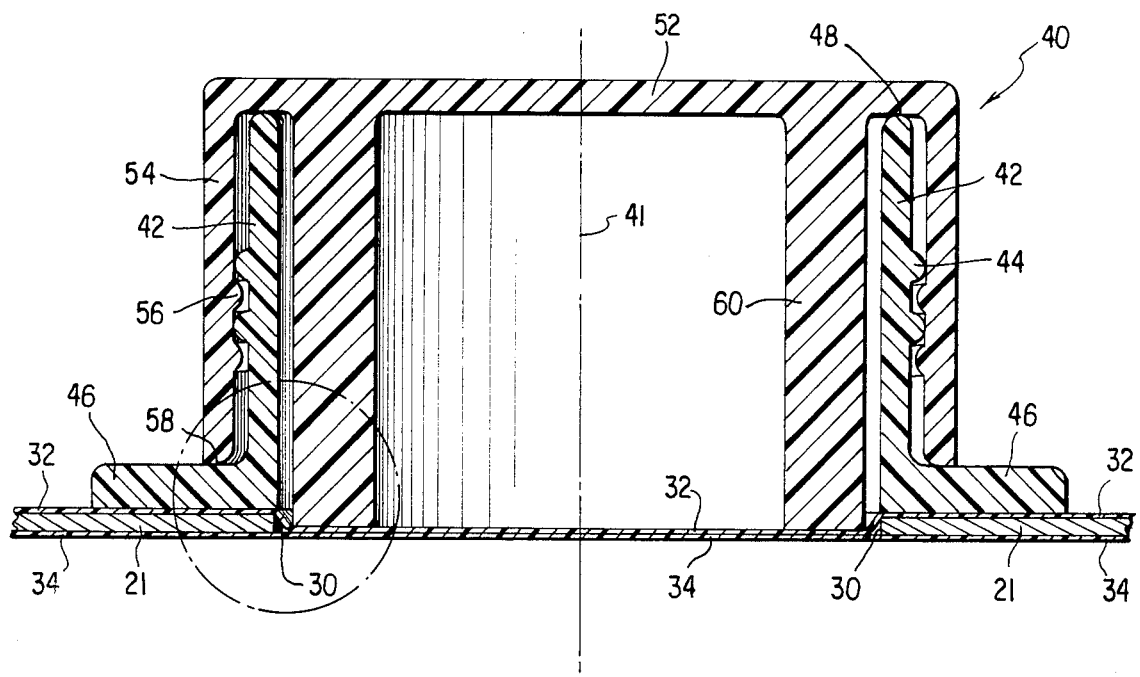
FIG. 2 is a view taken along section 2-2 of FIG. 1.
Figure 3:
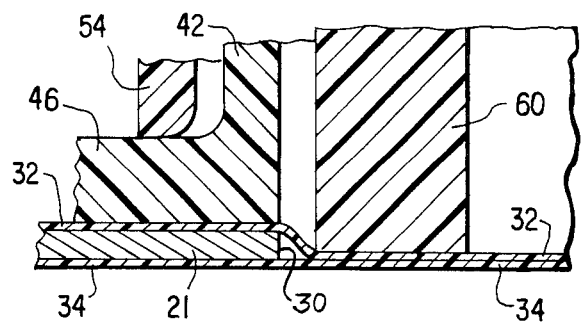
FIG. 3 is an enlarged view of the encircled portion of FIG. 2.

Referring now to FIGS. 2 and 3 of the drawings, the numeral 21 denotes the paperboard thickness from which the carton 10 is formed, the exterior surface of the paperboard being provided with a continuous extrusion of low density polyethylene, typically extrusion grade polyethylene of 0.75 of 1.0 mil in thickness. Such a polyethylene layer on the external surface of the container is conventional in this art. The numeral 34 denotes a carton interior barrier layer which may be defined by a single layer of, for example, Surlyn, a metallic foil, a layer of polyethylene, or other materials. Alternatively, the barrier layer 34 may be in the form of a laminate defined by two or more layers of different materials. The exact composition of laminate 34 forms no part of this invention, it being understood that its exact composition is determined by the product which is to be packaged in container 10. The numeral 30 denotes a die cut dispensing opening in paperboard 21, this opening usually being die cut prior to the placement of layer 32 and 34 on opposite surfaces of the paperboard. The pour spout is defined by a continuous annular or cylindrical member 42 having radially outwardly disposed screw threads 44 integrally molded therewith and having a lower radially disposed flange 46. The lower portions of flange 46 are adhered to a portion of the external polyethylene coating 32 in a manner soon to be described. The placement of the pour spout is such that its passageway is coincident with dispensing opening 30. The cap is defined by a disc 52 having a radially outward depending skirt 54 whose radially innermost portions are provided with integral threads 56 and whose lowermost portion 58 is in surface contact with an upper surface portion of flange 46. The outermost edge 46 of the spout wall 42 engages a lower surface portion of disc 52. Screw threads 44 and 56 interengage, the action being such that upon unscrewing the cap, the screw threads will force the cap upwardly and away from the interior of the container 10. The numeral 60 denotes a radially innermost annular skirt, also integral with and depending from the same side or surface of disc 52 as skirt 54. Skirt 60 is longer than skirt 54 to compensate for thickness of paperboard 21 and to ensure that pressure is exerted against the mandrel during the sealing process. Thus, tubular portion 42 of the pour spout is radially intermediate the innermost and outermost skirts of disc 52, with disc 52 and its associated skirts defining a screw cap. The radial thickness of skirt 60, at its junction with barrier layers 32 and 34 is greater than the radial wall thickness of cap elements 54 and 42. This provides a broader sealing surface for barrier layers 32 and 34.

Referring now to FIG. 3 of the drawings, it will be seen that the edge of dispensing opening 30 in paperboard 21 is spanned or covered completely by both barrier layer 34 and polyethylene external coating 32. Layers 32 and 34 form a two layer laminate, bearing in mind that layer 43 may itself also be a laminate, as earlier described. The lower, annularly continuous edge of innermost skirt 60 is flat and bears upons and is adhered to the indicated annular zone of barrier layer 34. It will be seen that layer 32 covers the exposed raw die cut edge of paperboard 21.

One manner of formation of the construction indicated in FIGS. 2 and 3 is as follows. After the formation of carton 10, but with the gable top still open and with the cap and pour spout being screwed together, the assembly 40 is placed in the indicated position relative to opening 30, shown at FIG. 2. A mandrel is inserted into the interior of the still open mouth of container 10, with the mandrel abutting the interior surface of barrier layer 34 and forming a backup support. Hot air or radiant heat is applied to the external surface of gable top wall 20 immediately around opening 30 to thereby soften the polyethylene coating 32, with flange 46 placed on the softened layer 32 to thereby adhere flange 46 to wall 20 and the base of skirt 60 to layer 32. An external mandrel is also employed to press the assembly 40 against the internally positioned mandrel. This pressure is maintained until the coating 32 cools and thereby effects permanent adhesion of the flange 46 to layer 32 and the base of skirt 60 to layer 32. It will be understood that this described manner of placing the assembly 40 on paperboard panel 20 is exemplary only, while other methods, such as ultrasonic adhesion, impulse heating, known to workers in this art may be employed. The particular process of the joining of the assembly 40 to panel portion 20 forms no part of the invention.

After the assembly 40 has been installed, the container 10 is filled with a particular liquid and the gable top is closed by convention apparatus or methods.

Figure 4:
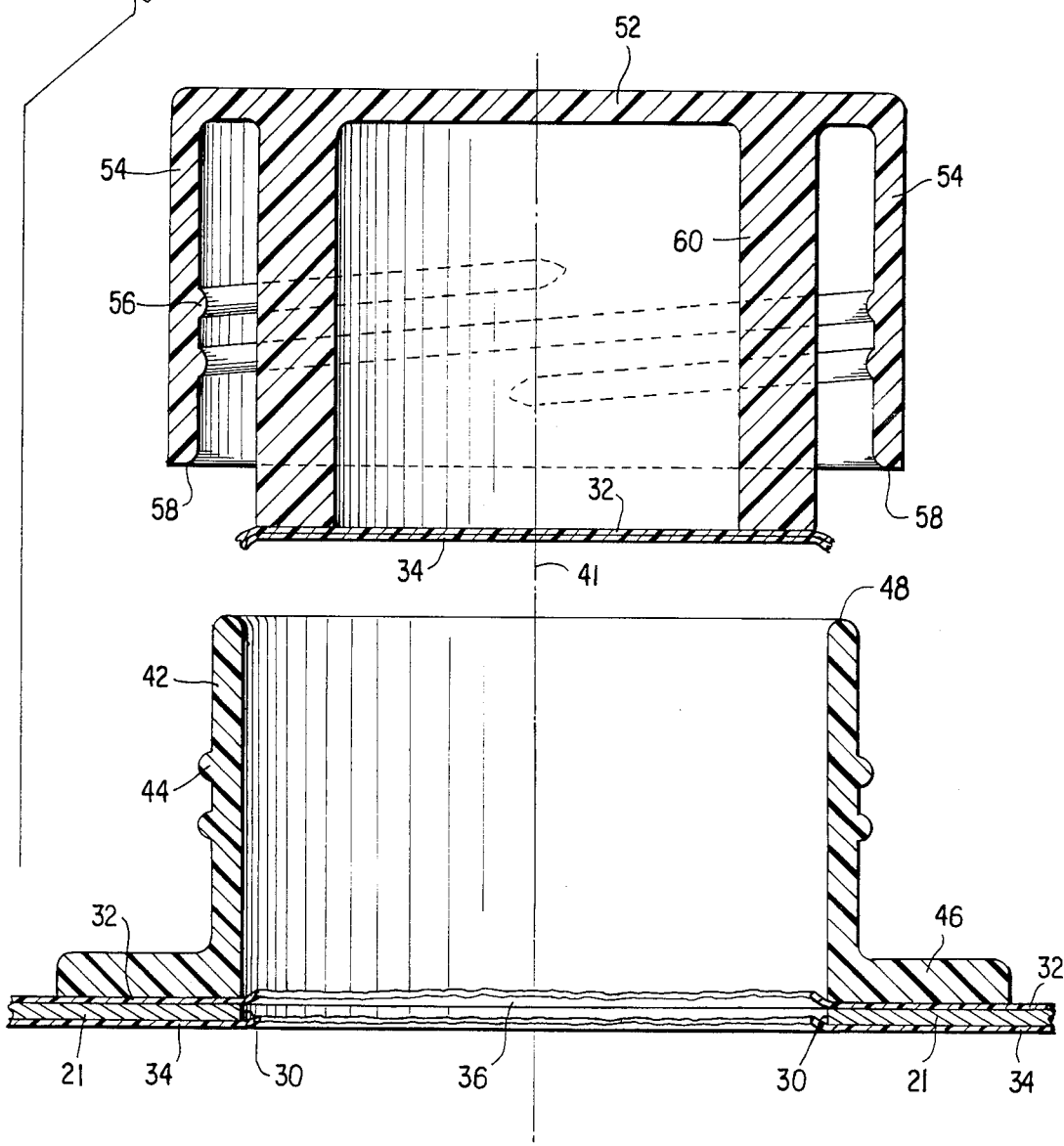
FIG. 4 is a view similar to FIG. 2 and shows the configuration of the pour spout and screw cap construction of this invention immediately after rupture of the barrier layer has taken place upon initial opening of the container.

The operation of the invention described above is shown in FIG. 4 of the drawings. There, the cap has been unscrewed by the user applying torque to outermost skirt 54, causing disk 52 and innermost skirt 60 to move away from the interior of the carton, i.e., in a direction upwardly as indicated at FIGS. 2 and 4. This results in a rupture of the laminate defined by extrusion coating 32 and barrier layer 34, such that both of these layers are stretched and ripped to thereby permit dispensing of the contents from the container 10 through opening 30 after the screw cap has been completely removed from the pour spout. During the extrusion of the barrier layers 32 and 34 these two layers are fused together due to the heat and pressures generated during this extrusion process.

From the above, it will be seen that the present invention yields a container and pour spout combination which utilizes the necessary interior barrier layer for the packaging of liquids and or powders, particularly in long shelf life barrier conditions, and which requires only a vertically extending (referring to FIG. 2) extension on the underside of the cap which is positioned inside the vertical walls of the pour spout, this vertical extension being the innermost skirt 60. The reader will readily visualize that except for the radially innermost skirt 60, the cap and carton construction are conventional. Preferably, both the pour spout and the screw cap are produced using conventional injection molding type machines. The material for the pour spout is polyethylene, a material which exhibits easy formability and has been approved by the Food and Drug Administration. It also exhibits substantial heat seal compatability with the low density polyethylene extrusion coating 32. Alternatively, the screw cap may be made of a higher density polyethelene if greater strength and formability is required. It will further be seen that rupture of exterior extrusion coating 32 and barrier layer 34 is effected not only by movement in a perpendicular direction of innermost skirt 60, but also by a rotation of this skirt upon the initial unscrewing of the screw cap. Resealing of the container, in the event all of the contents have not been dispensed upon the initial opening, is effected by simply screwing the cap back on, although the barrier properties of the container will now have been lost due to rupture of the barrier layers 32 and 34. The force required to rupture the barrier layers 32 and 34 indicates to the consumer that the package has not been tampered with. In addition, as seen in FIG. 4, barrier layers 32 and 34 (having been ruptured) also lend visual proof of tampering.

It will further be observed that the adhering of the pour spout to the container does not require any additional or special adhesive materials in those cases wherein, as is conventional, the paperboard container is coated with an external layer of polyethylene. This polyethylene thus serving its usual function, as well as functioning as an adhesive for attaching the pour spout. In this same connection, it will be obvious that while the use of a container having external layer 32 of polyethylene is a preferred method of using the assembly 40 of this invention, the layer 32 may be omitted and some other adhesive may then take the place of layer 32 for joining the barrier layer 34 to the lower edge of innermost skirt 60 and for joining flange 46 to the paperboard panel or wall 20. It will be apparent that the outer skirt 54 may be omitted and interengaging screw threads located on the radially outermost surface of inner skirt 60 and the radially innermost surface of spout wall 42. The radial extent of disc 52 would be such that outermost edge 48 of the spout would still engage the lower surface of disc 52, to limit downward screwing of the thus modified cap. While the package 10 has been illustrated as of gable top form, the invention can be utilized with a package or container of any form.

We claim:

1. A pour spout and container construction adapted for barrier packaging of liquids and or powders, including a closed container having an exterior and an interior surface, one portion of said container having an opening therethrough to thereby define a dispensing opening, a barrier layer on said interior surface completely spanning and covering said dispensing opening, an annular pour spout rigidly mounted on said container, said pour spout having a spout passageway at least partially aligned with said dispensing opening, a cap releasably mounted on and carried by said pour spout by means of interengaging screw threads on said cap and said pour spout, said cap normally closing said pour spout, said cap including an innermost annular skirt integral therewith, said innermost skirt having a lower edge, said innermost skirt positioned interiorly of said pour spout, said innermost skirt lower edge being adhered to a portion of said dispensing opening spanning barrier layer, whereby when the cap is removed from the pour spout by unscrewing the cap, the barrier layer is ruptured to thereby permit dispensing of any contents of the container through the dispensing opening.

2. The pour spout and container construction of claim 1 wherein said cap is defined by a disc having said innermost annular skirt and an outermost annular skirt, said skirts being radially spaced from each other, said skirts extending from the same side of said disc, at least a portion of said pour spout positioned between said innermost and outermost skirts.

3. The pour spout and container construction of claim 2 wherein said pour spout carries an integral, annular flange, said flange being adhered to an external surface of the container, around said dispensing opening.

4. The pour spout and container construction of claim 2 wherein said pour spout carries an integral, annular flange, said flange being adhered to the external surface of the container, around said dispensing opening, and wherein the innermost skirt is longer than the outermost skirt.

5. The pour spout and container construction of claim 4 wherein the outermost edge of the pour spout normally contacts a portion of said disc.

6. The pour spout and container construction of claim 4 wherein the lowermost portion of said outermost skirt normally contacts said pour spout flange

* * * * *